(12) United States Patent
Ticknor

(10) Patent No.: US 6,603,892 B1
(45) Date of Patent: Aug. 5, 2003

(54) MECHANICAL BEAM STEERING FOR OPTICAL INTEGRATED CIRCUITS

(75) Inventor: Anthony J. Ticknor, Cupertino, CA (US)

(73) Assignee: Lightwave Microsystems Corporation, San Jose, CA (US)

( * ) Notice: Subject to any disclaimer, the term of this patent is extended or adjusted under 35 U.S.C. 154(b) by 0 days.

(21) Appl. No.: 09/999,692

(22) Filed: Oct. 24, 2001

(51) Int. Cl.[7] .................................................. G02B 6/12
(52) U.S. Cl. ........................ 385/14; 385/37; 385/130; 385/24; 359/130
(58) Field of Search ............................ 385/14, 37, 129, 385/130, 131, 132, 24; 359/130

(56) References Cited

U.S. PATENT DOCUMENTS

| 5,905,824 | A | 5/1999 | Delisle et al. | |
|---|---|---|---|---|
| 6,087,280 | A | 7/2000 | Beall et al. | 501/7 |
| 6,118,909 | A | 9/2000 | Chen et al. | 385/15 |
| 6,137,939 | A | 10/2000 | Henry et al. | 385/132 |
| 6,169,838 | B1 | 1/2001 | He et al. | 385/129 |
| 6,201,918 | B1 | 3/2001 | Berkey et al. | 385/128 |
| 6,222,963 | B1 | 4/2001 | Grand et al. | 385/39 |
| 6,456,763 | B2 * | 9/2002 | Kashihara et al. | 385/37 |
| 2002/0009263 | A1 * | 1/2002 | Kashihara | 385/37 |
| 2002/0085808 | A1 * | 7/2002 | Ooyama | 385/37 |
| 2002/0097961 | A1 * | 7/2002 | Kazarinov | 385/37 |

FOREIGN PATENT DOCUMENTS

| CA | 2 344 582 | 10/2001 |
|---|---|---|
| EP | 1 087 246 A1 | 3/2001 |

* cited by examiner

Primary Examiner—John Juba, Jr.
Assistant Examiner—Leo Boutsikaris
(74) Attorney, Agent, or Firm—Amin & Turocy, LLP

(57) ABSTRACT

Optical circuits are disclosed having mechanical beam steering. The mechanical beam steering can mitigate thermal sensitivity of optical circuits, for example, arrayed waveguides. Also disclosed are methods for fabricating optical integrated circuits employing mechanical beam steering.

23 Claims, 6 Drawing Sheets

MECHANICAL BEAM STEERING FOR OPTICAL INTEGRATED CIRCUITS

TECHNICAL FIELD

The present invention relates to the art of optical integrated circuits and more particularly to apparatus and methods for mechanical beam steering for optical integrated circuits.

BACKGROUND OF THE INVENTION

Optical integrated circuits (OICs) come in many forms such as 1×N optical splitters, optical switches, wavelength division multiplexers (WDMs), demultiplexers, optical add/drop multiplexers (OADMs), and the like. Such OICs are employed in constructing optical networks in which light signals are transmitted between optical devices for carrying data and other information. For instance, traditional signal exchanges within telecommunications networks and data communications networks using transmission of electrical signals via electrically conductive lines are being replaced with optical fibers and circuits through which optical (e.g., light) signals are transmitted. Such optical signals may carry data or other information through modulation techniques, for transmission of such information through an optical network. Optical circuits allow branching, coupling, switching, separating, multiplexing and demultiplexing of optical signals without intermediate transformation between optical and electrical media.

Such optical circuits include planar lightwave circuits (PLCs) having optical waveguides on flat substrates, which can be used for routing optical signals from one of a number of input optical fibers to any one of a number of output optical fibers or optical circuitry. PLCs make it possible to achieve higher densities, greater production volume and more diverse functions than are available with fiber components through employment of manufacturing techniques typically associated with the semiconductor industry. For instance, PLCs contain optical paths known as waveguides formed on a silicon wafer substrate using lithographic processing, wherein the waveguides are made from transmissive media including lithium niobate ($LiNbO_3$) or other inorganic crystals, silica, glass, thermo-optic polymers, electro-optic polymers, and semiconductors such as indium phosphide (InP), which have a higher index of refraction than the chip substrate or the outlying cladding layers in order to guide light along the optical path. By using advanced photolithographic and other processes, PLCs are fashioned to integrate multiple components and functionalities into a single optical chip.

One important application of PLCs and OICs generally involves wavelength-division multiplexing (WDM) including dense wavelength-division multiplexing (DWDM). DWDM allows optical signals of different wavelengths, each carrying separate information, to be transmitted via a single optical channel or fiber in an optical network. For example, early systems provided four different wavelengths separated by 400 GHz, wherein each wavelength transferred data at 2.5 Gbits per second. Current multiplexed optical systems employ as many as 160 wavelengths on each optical fiber.

In order to provide advanced multiplexing and demultiplexing (e.g., DWDM) and other functions in such networks, arrayed-waveguide gratings (AWGs) have been developed in the form of PLCs. Existing AWGs can provide multiplexing or demultiplexing of up to 80 channels or wavelengths spaced as close as 50 GHz. As illustrated in FIG. 1, a conventional demultiplexing AWG 2 includes a base 4, such as a silicon substrate, with a single input port 6, and multiple output ports 8. Multiple wavelength light is received at the input port 6 (e.g., from an optical fiber in a network, not shown) and provided to an input lens 10 via an input optical path or waveguide 12 in the substrate base 4.

The input lens 10 spreads the multiple wavelength light into an array of waveguides 14, sometimes referred to as arrayed-waveguide grating arms. Each of the waveguides or arms 14 has a different optical path length from the input lens 10 to an output lens 16, resulting in a different phase tilt at the input to the lens 16 depending on wavelength. This phase tilt, in turn, affects how the light recombines in the output lens 16 through constructive interference. The lens 16 thus provides different wavelengths at the output ports 8 via individual output waveguides 18, whereby the AWG 2 can be employed in demultiplexing light signals entering the input port 6 into two or more demultiplexed signals at the output port 8. The AWG 2 can alternatively be used to multiplex light signals from the ports 8 into a multiplexed signal having two or more wavelength components at the port 6.

A problem with optical integrated circuits, such as the conventional AWG 2 of FIG. 1 is temperature sensitivity. Since the waveguide material usually has a temperature dependent refractive index, the channel wavelengths of multi/demultiplexer shift as the temperature varies. This shift is typically of the order of 0.01 nm/° C. in silica-based devices and 0.1 nm/° C. in InP based devices. This wavelength shift can result in a loss of signal and/or cross talk in communication system(s) employing the AWG 2. As communication system(s) are designed with increasingly smaller channel spacing, even a small temperature dependent wavelength shift can have a significant effect on system performance. Presently, AWG's must have active stabilization of the device operating temperature in order to perform acceptably. This stabilization is typically achieved by the addition of resistive heaters, temperature sensors, active electronics, and in some cases also thermoelectric coolers. Even though an AWG is a passive filter, currently it requires significant electronics and a few watts of power to operate effectively.

Accordingly, there remains a need for better solutions to temperature sensitivity in optical integrated circuits such as AWGs, which avoid or mitigate the performance reductions associated with conventional optical integrated circuits and provide for mitigation of active temperature stabilization and its associated costs.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter.

The present invention provides optical integrated circuit apparatus and methods for mechanical beam steering mitigating and/or overcoming the shortcomings associated with conventional optical integrated circuit(s) and other devices. The invention further comprises methods for fabricating OICs and for mitigating temperature sensitivity utilizing mechanical beam steering in OICs.

According to an aspect of the present invention, OICs are provided in which a first region and a second region are formed. The first region and the second region each have at least one waveguide and are coupled by a lens. An expansion block having a coefficient of thermal expansion different than a coefficient of thermal expansion of the first region and the second region is located between the first region and the second region. The expansion block expands and/or contracts with temperature changes causing the first region and/or at least a portion of the lens to move with respect to the second region. Thus, wavelength shift associated with waveguide temperature dependent refractive index can be mitigated.

According to another aspect of the present invention, an optical circuit (e.g., AWG or PLC) is provided in which an input region, a grating region and an output region are formed. The input region, the grating region and the output region each have at least one waveguide. The input region and the grating region are coupled by an input lens. Likewise, the grating region and the output region are coupled by an output lens. A first expansion block is placed between the input region and the grating region; a second expansion block is placed between the grating region and the output region. The first expansion block and the second expansion block each have a coefficient of thermal expansion different than a coefficient of thermal expansion of the input region, the grating region and the output region The first expansion block and the second expansion block expand and/or contract with temperature changes causing the input region and/or at least a portion of the input lens to move with respect to the grating region and the output region and/or at least a portion of the output lens to move with respect to the grating region. Thus, wavelength shift associated with waveguide temperature dependent refractive index can be mitigated.

Another aspect of the invention provides a methodology for fabricating an optical integrated circuit. The method comprises providing a base, forming at least one waveguide in an input region, forming at least one waveguide in a grating region and forming an input lens coupling the at least one waveguide of the input region to the at least one waveguide of the grating region. The input region and the grating region are then scroll-diced from each other such that a remaining mechanical continuity is generally through the lens area. Thereafter, a first expansion block is placed in between the input region and the grating region.

Optionally, the base can further comprise an output region. An output lens is formed coupling the at least one waveguide of the grating region to the at least one waveguide of the output region. The output region and the grating region are then scroll-diced from each other around the output lens A second expansion block is then placed between the output region and the grating region.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
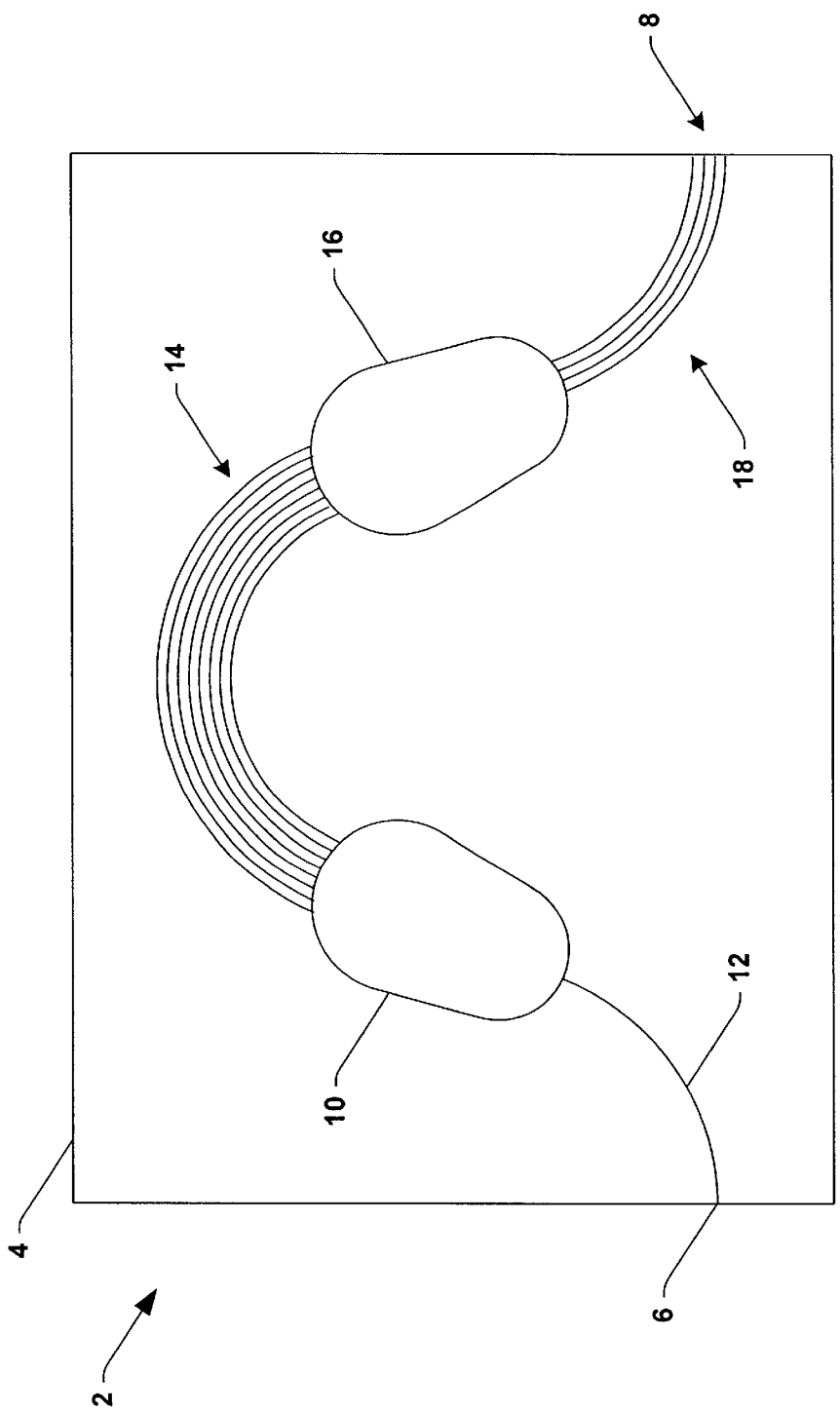
FIG. 1 is a schematic top plan view of a conventional arrayed-waveguide grating (AWG) multiplexer/demultiplexer device.

The various aspects of the present invention will now be described with reference to the drawings, wherein like reference numerals are used to refer to like elements throughout. The invention provides for mitigation of temperature sensitivity of optical integrated circuits by employing mechanical beam steering.

Figure 2:
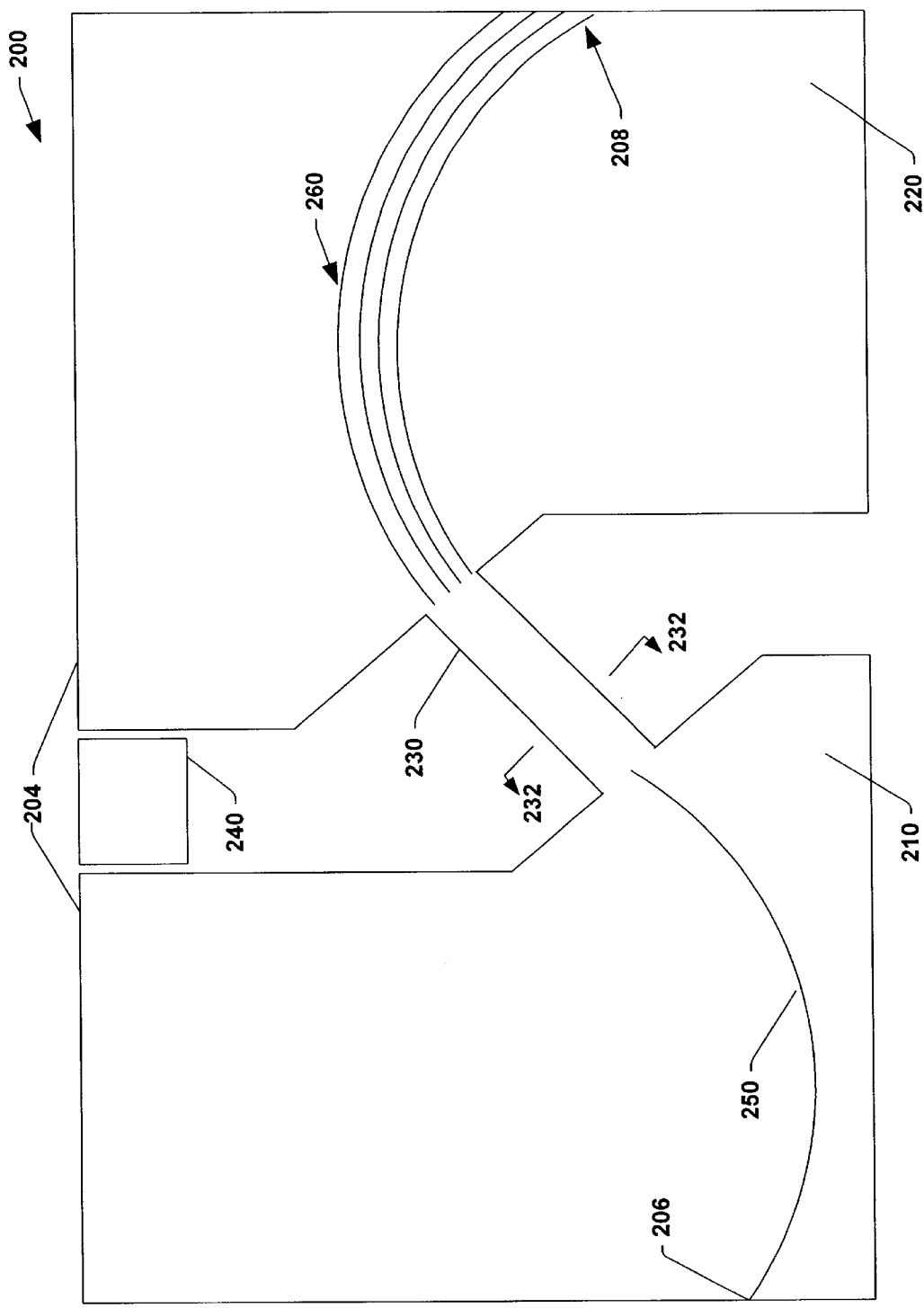
FIG. 2 is a schematic top plan view of an exemplary optical integrated circuit in accordance with an aspect of the present invention.

One exemplary implementation of the invention is illustrated in FIG. 2, in which an optical integrated circuit (OIC) 200 includes a base 204, such as a silicon substrate, is formed into a first region 210 and a second region 220 in any suitable manner. For example, scroll-dicing (e.g. using a water-jet, laser-wafer-cutter and/or wire-saw) may be employed to mechanically isolate the first region 210 and the second region 220 leaving a monolithic connection through the lens 230. The OIC 200 further includes first region waveguide(s) 250, second region waveguide(s) 260, a lens 230 and an expansion block 240. The OIC 200 can optionally include an input port 206 and output port(s) 208.

The first region 210 and the second region 220 are coupled by the lens 230. The lens 230 can spread light from the first region waveguide(s) 250 to the second region waveguide(s) 260. Alternatively, the lens 230 can focus light from the second region waveguide(s) 260 to the first region waveguide(s) 250.

Figure 3:
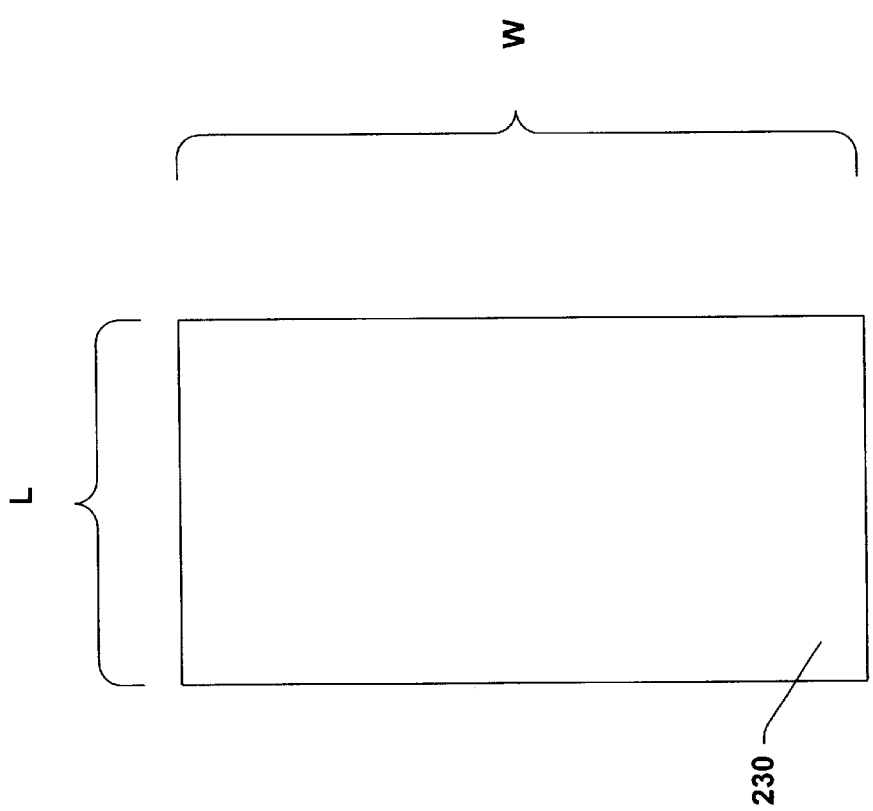
FIG. 3 is a cross section view of an exemplary lens.

Referring to FIG. 3, a cross-sectional view taken along the line 232–232 of the OIC of FIG. 2 is illustrated. The lateral dimension of the cross section of the lens 230, L, is generally less than the nominal width of the lens 230, W. Accordingly, flexing due to external force, such as from the expansion block 240 as further described below, is permitted. In one embodiment, the lateral dimension L of the cross section of the lens 230 is about 10 micron or more and about 10000 microns or less. In another embodiment, the lateral dimension L of the cross section of the lens 230 is about 100 microns or more and about 5000 microns or less. In yet a third embodiment, the lateral dimension L of the cross section of the lens 230 is about 500 microns or more and about 2000 microns or less.

Referring back to FIG. 2, the expansion block 240 has a coefficient of thermal expansion different than a coefficient of thermal expansion of the first region 210 and the second region 220 and is located between the first region 210 and the second region 220. For example, the expansion block 240 can be made of metal, cross-linked polymer such as silicone rubber and/or any other suitable material. The expansion block 240 expands and/or contracts with temperature changes causing the first region 210 and/or at least a portion of the lens 230 to move with respect to the second region 220. The expansion block 240 can be held in place (e.g., kinematically and/or with an adhesive).

In one embodiment, the expansion block 240 causes the first region 210 to move about 0.5 micron or more and about 100 microns or less respect to the second region 220 in response to temperature changes within the normal operating range of the device (e.g., in the range of about −20° C. to about +95° C.). In another embodiment, the expansion block 240 causes the first region 210 to move about 5 microns or more and about 50 microns or less with respect to the second region 220. In a third embodiment, the expansion block 240 causes the first region 210 to move about 10 microns or more and about 25 microns or less with respect to the second region 220.

For example, multiple wavelength light can be received at the input port 206 (e.g., from an optical fiber in a network, not shown) and transported via the first region waveguide(s) 250 and provided to the lens 230. The lens 230 can process (e.g., spread) the multiple wavelength light into the second region waveguide(s) 260 (e.g., arrayed waveguide grating arms). The second region waveguide(s) 260 can then provide the multiple wavelength light to the output port(s) 208.

Figure 4:
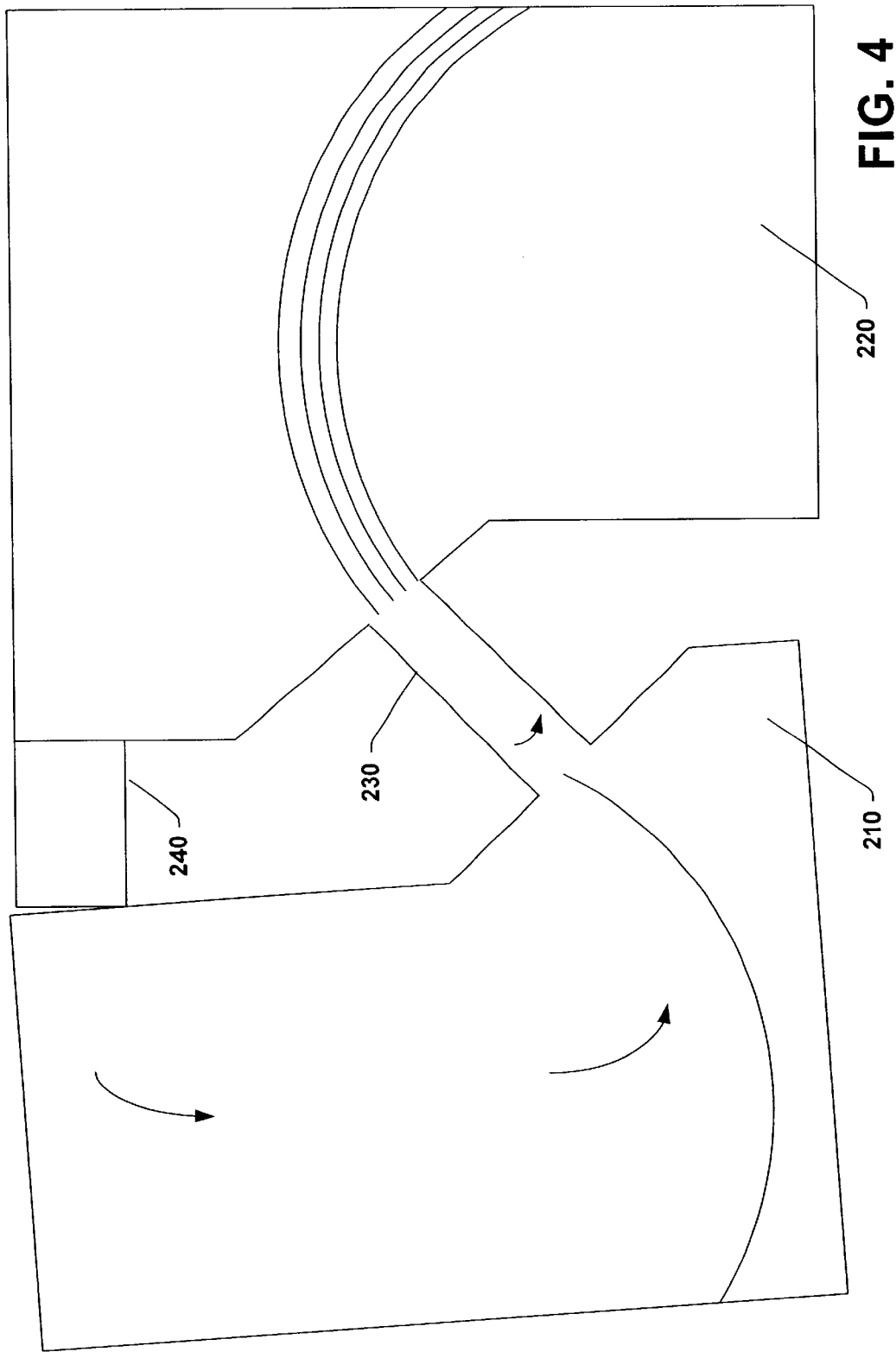
FIG. 4 is a schematic top plan view of the exemplary optical integrated circuit of FIG. 2 with an expansion block in an expanded state.
Figure 5:
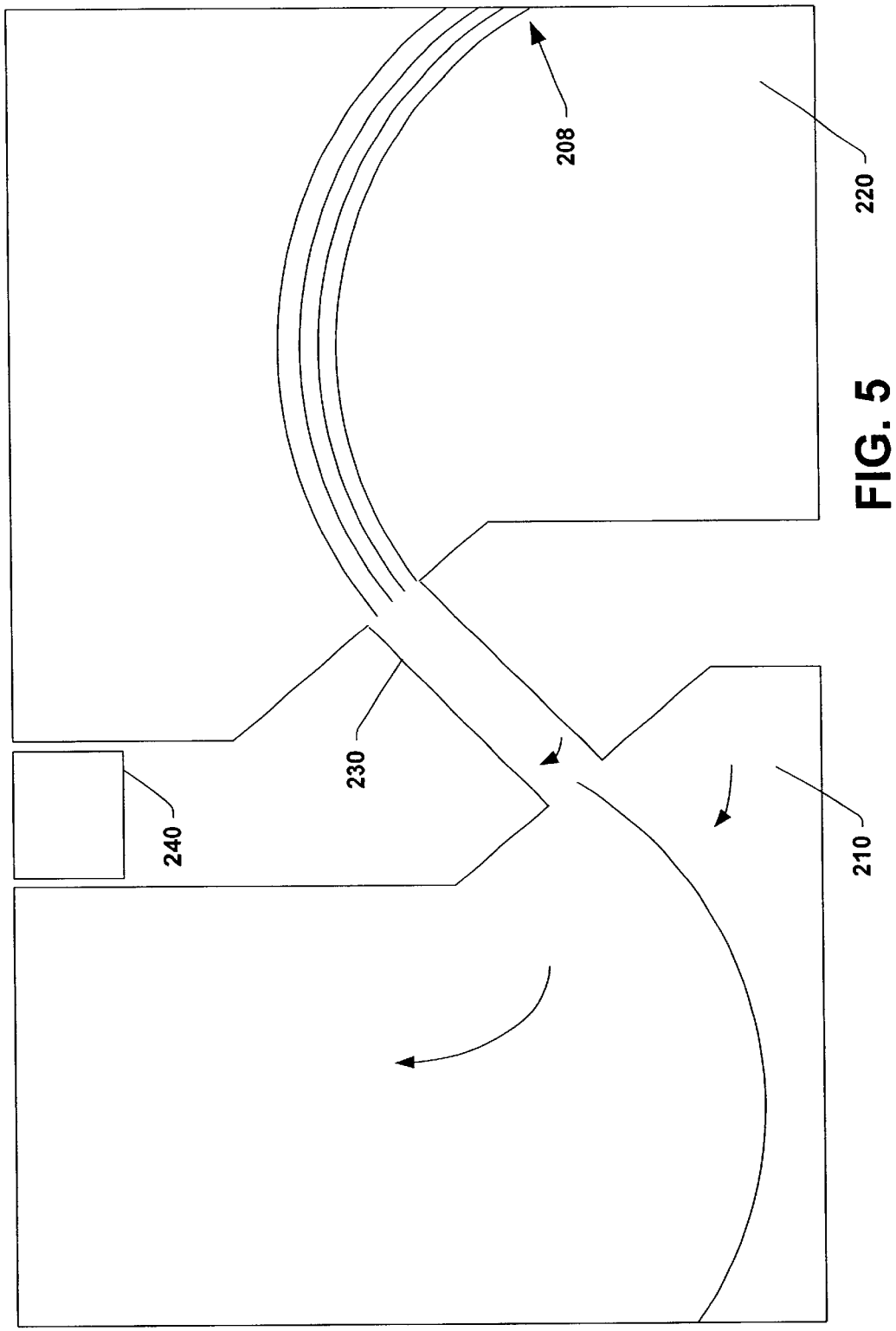
FIG. 5 is a schematic top plan view of an exemplary optical integrated circuit of FIG. 4 with the expansion block in a contracted state.

As the temperature of the OIC 200 increases, the index of refraction of the first region waveguide(s) 250 and/or the index of refraction of the second region waveguide(s) 260 may change. In order to compensate for this temperature based index of refraction change, the expansion block 240 expands as a result of the temperature change, causing the first region 210 and/or at least a portion of the lens 230 to move (e.g., rotate) with respect to the second region 220 as illustrated by the arrows in FIG. 4. Similarly, as the temperature of the OIC 200 decreases, the expansion block 240 contracts causing the first region 210 and/or at least a portion of the lens 230 to move (e.g., rotate) with respect to the second region 220 as illustrated by the arrows in FIG. 5. It is believed that the movement (rotation) caused by temperature changes corresponds to or compensates for the temperature-change induced wavelength shifts in the first region and/or second region waveguide(s) 250, 260 due to temperature dependent refractive index. As such, wavelength shift associated with waveguide temperature dependent refractive index change can be mitigated. Thus, loss of signal and/or cross talk in communication system(s) employing the OIC 200 can be reduced.

Figure 6:
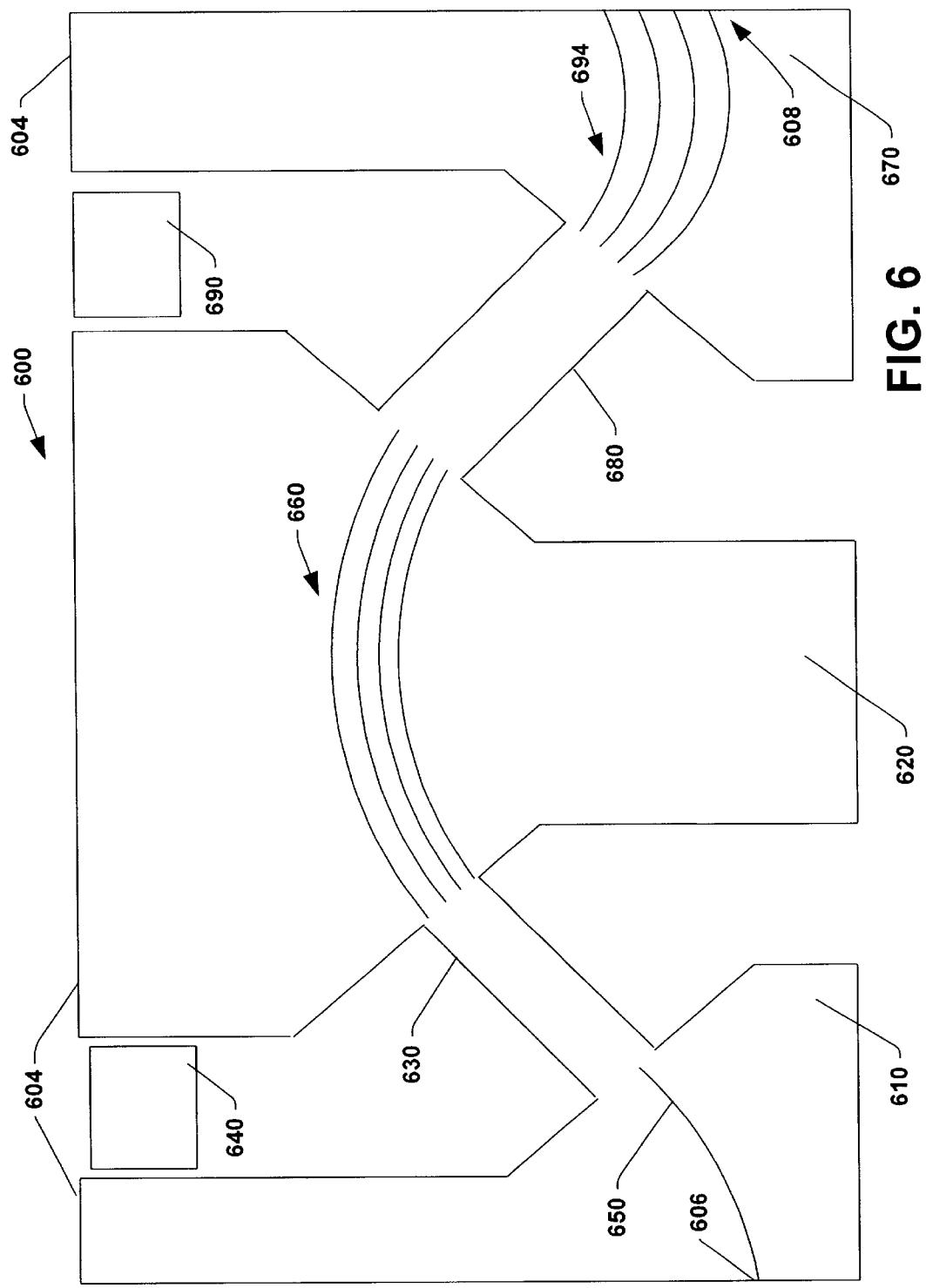
FIG. 6 is a schematic top plan view of another exemplary optical integrated circuit in accordance with an aspect of the present invention.

Turning to FIG. 6, another exemplary implementation of the invention is illustrated in which an optical integrated circuit (OIC) 600 includes a base 604, such as a silicon substrate, formed (e.g., scroll-diced) into an input region 610, a grating region 620 and an output region 670. The OIC 600 further includes input waveguide(s) 650, grating region waveguide(s) 660, output waveguide(s) 694, an input lens 630, an output lens 680, a first expansion block 640 and a second expansion block 690. The OIC 600 can optionally include an input port 606 and output port(s) 608.

The input region 610 and the grating region 620 are coupled by the input lens 630; the grating region 620 and the output region 670 are coupled by the output lens 680. The lateral dimensions of the cross section of the input lens 630 and the output lens 680 are generally less than the nominal width of the OIC 600. Accordingly, flexing due to external force, such as from the first expansion block 640 and/or the second expansion block 690 as further described below, is permitted. In one embodiment, the lateral dimension of the cross section of the input lens 630 is the same at the lateral dimension of the cross section of the output lens 680. In another embodiment, the lateral dimension of the cross second of the input lens 630 is greater than the lateral dimension of the cross section of the output lens 680. In yet another embodiment, the lateral dimension of the cross section of the input lens 630 is less than the lateral dimension of the cross section of the output lens 680.

For example, multiple wavelength light can be received at the input port 606 (e.g., from an optical fiber in a network, not shown) and transported via the input region waveguide(s) 650 and provided to the input lens 630. The input lens 630 processes (e.g., spreads) the multiple wavelength light into the grating region waveguide(s) 660 (e.g., arrayed waveguide grating arms).

Each of the grating region waveguide(s) 660 can individually extend axially along different, generally curvilinear optical paths from the input lens 630 to an second output lens 680, resulting in a different phase tilt at the input to the second output lens 680 depending on wavelength. This phase tilt, in turn, affects how the light recombines in the second output lens 680 through constructive interference. The second output lens 680 thus provides different wavelengths at the output ports 608 via individual output waveguide(s) 694, whereby the OIC 600 can be employed in demultiplexing light signals entering the input port 606 into two or more demultiplexed signals at the output port(s) 608.

The OIC 600 can alternatively be used to multiplex light signals from the output port(s) 608 into a multiplexed signal having two or more wavelength components at the input port 606. Although illustrated with a single input waveguide 650 and four output waveguides 694 associated with input lens 630 and output lens 280, respectively, any number of such input and output waveguide(s) 650 and 694 can be employed in accordance with the present invention. In addition, it will be appreciated that any appropriate number of grating waveguide(s) 660 may be used in the OIC 600.

As temperature of the OIC 600 increases, the index of refraction of the input waveguide(s) 650, the index of refraction of the grating region waveguide(s) 660, and/or the index of refraction of the output region waveguide(s) 694 can change. In order to compensate for this temperature based index of refraction change, the first expansion block 640 expands causing the input region 610 and at least a portion of the input lens 630 to move (e.g., rotate) with respect to the grating region 620. Likewise, the second expansion block 690 expands causing the output region 670 and at least a portion of the output lens 680 to move (e.g., rotate) with respect to the grating region 620. In one embodiment, the first expansion block 640 and the second expansion block 690 are made of the same or similar material resulting in substantially the same thermal expansion characteristic. In another embodiment, the first expansion block 640 is made of a material having a greater coefficient of thermal expansion than the second expansion block 690. In yet another embodiment, the first expansion block 640 is made of a material having a lesser coefficient of thermal expansion than the second expansion block 690.

Additionally, as temperature of the OIC 600 decreases, the first expansion block 640 contracts causing the input region 610 and at least a portion of the first input lens 630 to move (e.g., rotate) with respect to the grating region 620. Likewise, as temperature of the OIC 600 decreases, the second expansion block 690 contracts causing the output region 670 and at least a portion of the output lens 680 to move with respect to the grating region 620. In this manner, wavelength shift associated with waveguide temperature dependent refractive index change is mitigated.

Another aspect of the invention provides methodologies for manufacturing an optical integrated circuit, wherein a base is provided having at least one waveguide in an input region and at least one waveguide in a grating region. An input lens is provided between the input region and the grating region and the input region is scroll-diced from the grating region. Alternatively, the input region can be separated from the grating region (e.g., beyond the input lens—excluding the input lens) by patterned etching of the base. A first expansion block is provided between the input region and the grating region.

Optionally, the base can further comprise at least one waveguide in an output region. An output lens is provided between the grating region and the output region and the output region is scroll diced from the grating region. Alternatively, the output region can be separated from the grating region (e.g., beyond the output lens—excluding the output lens) by patterned etching of the base. A second expansion block is provided between the output region and the grating region.

It is to be appreciated by those skilled in the art, that while the present invention has been described with respect to scroll dicing in order to effect separation between regions, that any suitable means for separating regions may be employed within the scope of the present invention, including, but not limited to, laser dicing and patterned etching.

Although the invention has been shown and described with respect to certain illustrated implementations, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes", "including", "with", "has", "having", and variants thereof are used in either the detailed description or the claims, these terms are intended to be inclusive in a manner similar to the term "comprising."

What is claimed is:

1. An optical integrated circuit, comprising:
 a first region having a waveguide on a substrate having a first thermal expansion coefficient;
 a second region having a waveguide on a substrate having a second thermal expansion coefficient mechanically isolated from the first region to permit the first region and the second region to rotate about each other;
 a lens optically coupling the first region waveguide and the second region waveguide; and
 an expansion block located between the first region and the second region having a third thermal expansion coefficient, the expansion block positioned to rotate the first region relative to the second region in response to a temperature change,
 wherein the third thermal expansion coefficient is different from the first thermal expansion coefficient and the third thermal expansion coefficient is different from the second thermal expansion coefficient.

2. The optical integrated circuit of claim 1, wherein the third thermal expansion coefficient is less than the first thermal expansion coefficient and the second thermal expansion coefficient.

3. The optical integrated circuit of claim 1, wherein the third thermal expansion coefficient is greater than the first thermal expansion coefficient and the second thermal expansion coefficient.

4. The optical integrated circuit of claim 1, wherein in response to a temperature excursion within the range of about −20° C. to about +95° C., the expansion block causes the first region to rotate about 0.5 micron or more and about 100 microns or less with respect to the second region.

5. The optical integrated circuit of claim 1, wherein in response to a temperature excursion within the range of about −20° C. to about +95° C., the expansion block causes the first region to rotate about 5 microns or more and about 50 microns or less with respect to the second region.

6. The optical integrated circuit of claim 1, wherein in response to a temperature excursion within the range of about −20° C. to about +95° C., the expansion block causes the first region to rotate about 10 microns or more and about 25 microns or less with respect to the second region.

7. The optical integrated circuit of claim 1, wherein the lens has a lateral dimension of about 10 micron or more and about 10000 microns or less.

8. The optical integrated circuit of claim 1, wherein the lens has a lateral dimension of about 100 microns or more and about 5000 microns or less.

9. The optical integrated circuit of claim 1, wherein the lens has a lateral dimension of about 500 microns or more and about 2000 microns or less.

10. The optical integrated circuit of claim 1, wherein at least one of the first region and the second region is comprised of at least one selected from the group of doped silica, lithium niobate, undoped silica, glass, thermo optic polymers, electro optic polymers and indium phosphide.

11. The optical integrated circuit of claim 1, wherein the expansion block comprises at least one selected from the group of metal and cross-linked polymer.

12. An optical integrated circuit, comprising:
 an input region having a waveguide;
 a grating region having a waveguide mechanically isolated from the input region to permit the input region and the grating region to rotate about each other;
 an input lens optically coupling the input region waveguide and the grating region waveguide;
 an output region having a waveguide mechanically isolated from the grating region to permit the output region and the grating region to rotate about each other;
 an output lens optically coupling the grating region waveguide and the output region waveguide;
 a first expansion block located between the input region and the grating region, the first expansion block positioned to rotate the input region relative to the grating region in response to a temperature change; and
 a second expansion block located between the output region and the grating region, the second expansion block positioned to rotate the output region relative to the grating region in response to a temperature change.

13. The optical integrated circuit of claim 12, wherein a lateral dimension of the input lens is substantially the same as a lateral dimension of the output lens.

14. The optical integrated circuit of claim 12, wherein a lateral dimension of the input lens is less than a lateral dimension of the output lens.

15. The optical integrated circuit of claim 12, wherein the first expansion block and the second expansion block have substantially similar coefficients of thermal expansion.

16. The optical integrated circuit of claim 12, wherein the first expansion block has a coefficient of thermal expansion greater than a coefficient of thermal expansion of the second expansion block.

17. The optical integrated circuit of claim 12, wherein the first expansion block has a coefficient of thermal expansion less than a coefficient of thermal expansion of the second expansion block.

18. A method of making an optical integrated circuit, comprising:

providing a base having at least one waveguide in an input region and at least one waveguide in a grating region;

providing an input lens between the input region and the grating region;

scroll dicing the input region from the grating region to mechanically isolate the grating region from the input region to permit the input region and the grating region to rotate about each other; and providing a first expansion block between the input region and the grating region, the first expansion block positioned to rotate the input region relative to the grating region in response to a temperature change.

19. The method of claim 18, the act of providing a base further comprising:

the base having at least one waveguide in an output region.

20. The method of claim 19, further comprising:

providing an output lens between the grating region and the output region;

scroll dicing the output region from the grating region to mechanically isolate the grating region from the output region to permit the output region and the grating region to rotate about each other;

providing a second expansion block between the output region and the grating region, the second expansion block positioned to rotate the output region relative to the grating region in response to a temperature change.

21. A method of making an optical integrated circuit, comprising:

providing a base having at least one waveguide in an input region and at least one waveguide in a grating region;

providing an input lens between the input region and the grating region;

separating the input region from the grating region beyond the input lens by patterned etching of the base to mechanically isolate the grating region from the input region to permit the input region and the grating region to rotate about each other; and providing a first expansion block between the input region and the grating region, the first expansion block positioned to rotate the input region relative to the grating region in response to a temperature change.

22. The method of claim 21, the act of providing a base further comprising:

the base having at least one waveguide in an output region.

23. The method of claim 22, further comprising:

providing an output lens between the grating region and the output region;

separating the output region from the grating region beyond the output lens by patterned etching of the base to mechanically isolate the grating region from the output region to permit the output region and the grating region to rotate about each other; and providing a second expansion block between the output region and the grating region, the second expansion block positioned to rotate the output region relative to the grating region in response to a temperature change.

* * * * *